(12) United States Patent
 Zhang

(10) Patent No.: US 9,154,503 B2
(45) Date of Patent: Oct. 6, 2015

(54) AUTHORIZATION METHOD AND TERMINAL DEVICE

(71) Applicant: Huawei Device Co., LTD, Shenzhen (CN)

(72) Inventor: Qinliang Zhang, Shenzhen (CN)

(73) Assignee: Huawei Device Co., LTD., Shenzhen (CN)

( * ) Notice: Subject to any disclaimer, the term of this patent is extended or adjusted under 35 U.S.C. 154(b) by 23 days.

(21) Appl. No.: 14/028,994

(22) Filed: Sep. 17, 2013

(65) Prior Publication Data

US 2014/0020118 A1    Jan. 16, 2014

Related U.S. Application Data

(63) Continuation of application No. PCT/CN2012/074061, filed on Apr. 16, 2012.

(30) Foreign Application Priority Data

Apr. 15, 2011   (CN) .......................... 2011 1 0095586

(51) Int. Cl.
 *H04L 29/06*  (2006.01)
 *H04L 12/24*  (2006.01)
(52) U.S. Cl.
 CPC ............... *H04L 63/10* (2013.01); *H04L 41/28* (2013.01); *H04L 63/105* (2013.01); *H04L 63/101* (2013.01)
(58) Field of Classification Search
 USPC ...................................... 726/2, 29
 See application file for complete search history.

(56) References Cited

U.S. PATENT DOCUMENTS

| 5,999,978 | A  | * | 12/1999 | Angal et al. .................. 709/229 |
| 7,493,651 | B2 | * | 2/2009  | Vanska et al. ..................... 726/2 |
| 8,001,610 | B1 | * | 8/2011  | Chickering et al. ............ 726/27 |
| 2006/0198525 | A1 | * | 9/2006 | Brey et al. ..................... 380/278 |
| 2007/0162755 | A1 |   | 7/2007 | Costa-Requena et al. |
| 2007/0213048 | A1 | * | 9/2007 | Trauberg .................... 455/432.3 |
| 2008/0092211 | A1 |   | 4/2008 | Klemets et al. |
| 2011/0029779 | A1 | * | 2/2011 | Sekiya et al. ................. 713/176 |
| 2013/0305393 | A1 |   | 11/2013 | Zhang et al. |

FOREIGN PATENT DOCUMENTS

| CN | 1652509 A    | 8/2005 |
| CN | 101521575 A  | 9/2009 |
| CN | 101523801 A  | 9/2009 |
| EP | 2408140 A1   | 1/2012 |
| WO | 2007069207 A2 | 6/2007 |

OTHER PUBLICATIONS

"Role-based access controls"; DF Ferraiolo et al; 15th National Computer Security Conference (1992) Baltimore, Oct. 13-16, 1992. pp. 554-563; 11 pages.*

(Continued)

*Primary Examiner* — Jason Lee
(74) *Attorney, Agent, or Firm* — Slater & Matsil, L.L.P.

(57) ABSTRACT

Embodiments of the present invention provide an authorization method and a terminal device. A terminal device receives a right application request from a control device having no access right. The terminal device notifies a control device having an administrator right to assign a right to the control device having no access right. The terminal device receives a right assignment command from the control device having an administrator right and assigning a right to the control device having no access right.

7 Claims, 4 Drawing Sheets

(56) References Cited

OTHER PUBLICATIONS

"Role-based access control models"; RS Sandhu et al; IEEE Computer, vol. 29, No. 2, Feb. 1996, pp. 38-47; 22 pages.*
International Search Report received in Application No. PCT/CN2012/074061, mailed Jul. 19, 2012, 4 pages.
Extended European Search Report received in Application No. 12771765.0-1853 mailed Apr. 23, 2014, 8 pages.
Lortz, V. et al., "Device Protection: 1 Service," for UPnP Version 1.0 Status: Standardized DCP (SDCP), Version 1.0, Feb. 24, 2011. 68 pages.

* cited by examiner

AUTHORIZATION METHOD AND TERMINAL DEVICE

CROSS REFERENCE TO RELATED APPLICATIONS

This application is a continuation of International Application No. PCT/CN2012/074061, filed on Apr. 16, 2012, which claims priority to Chinese Patent Application No. 201110095586.0, filed on Apr. 15, 2011, both of which are hereby incorporated by reference in their entireties.

FIELD OF THE INVENTION

Embodiments of the present invention relate to the field of communications technologies, and in particular, to an authorization method and a terminal device.

BACKGROUND OF THE INVENTION

To implement intercommunication and control of different types of household devices, more and more household devices realize intercommunication and control through supporting the universal plug and play (UPnP) technology.

In a UPnP device system, a user implements control over a household device through a control point in a home network, where the control point adopts a UPnP protocol to read state and control information of a UPnP device in the home network and control the UPnP device to perform a corresponding operation by invoking a related control command from the UPnP device.

In order to ensure the security of the control by a control point over a UPnP device, a security service is provided in the UPnP technology, and the UPnP device may verify an access right of the control point through the security service, and only a control point having an access right is allowed to manage the UPnP device.

In the prior art, when a control point controls a UPnP device, the control point may be rejected because the control point has no access right; however, in the prior art, when a control point having no access right needs to manage a UPnP device, the control point cannot proactively apply for an access right.

SUMMARY OF THE INVENTION

Embodiments of the present invention provide an authorization method and a terminal device, so as to enable a control device to proactively apply for a right and to obtain authorization for performing a management operation to be performed on the terminal device.

In one aspect, an authorization method is provided. A terminal device receives, a right application request from a control device having no access right. The terminal device notifies a control device having an administrator right to assign a right to the control device having no access right. The terminal device receives a right assignment command from the control device having an administrator right, and assigning a right to the control device having no access right.

In another aspect, a terminal device is further provided. A receiving module is configured to receive a right application request from a control device having no access right. A notification module is configured to notify a control device having an administrator right to assign a right to the control device having no access right. An assignment module is configured to assign a right to the control device having no access right after the receiving module receives a right assignment command from the control device having an administrator right.

With the embodiments of the present invention, after receiving the right application request from the control device having no access right, the terminal device notifies the control device having an administrator right to assign a right to the control device having no access right. Then, the terminal device may receive the right assignment command from the control device having an administrator right, and assign a right to the control device having no access right. In this way, the control device having no access right applies for a right proactively to obtain authorization for performing a management operation to be performed on the terminal device, thereby facilitating an operation of a user.

BRIEF DESCRIPTION OF THE DRAWINGS

To describe the technical solutions in the embodiments of the present invention or in the prior art more clearly, the following briefly introduces the accompanying drawings required for describing the embodiments Apparently, the accompanying drawings in the following description show merely some embodiments of the present invention, and persons of ordinary skill in the art may still derive other drawings from these accompanying drawings without creative efforts.

DETAILED DESCRIPTION OF THE EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Figure 1:
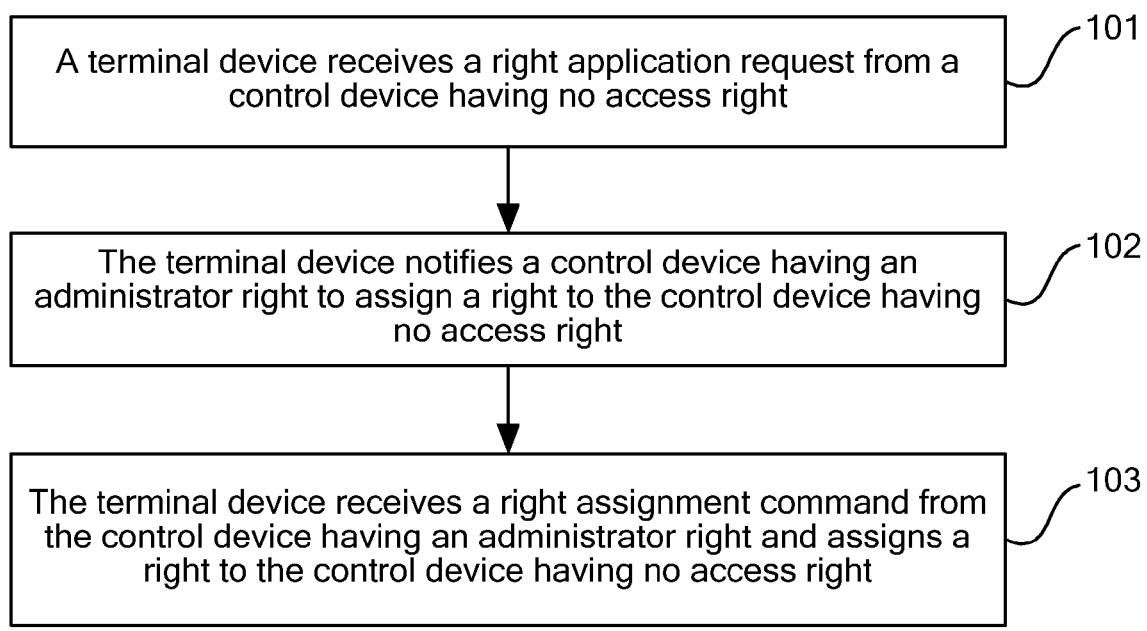
FIG. 1 is a flow chart of an embodiment of an authorization method according to the present invention.

FIG. 1 is a flow chart of an embodiment of an authorization method according to the present invention. As shown in FIG. 1, the authorization method may include the following steps.

Step 101: A terminal device receives a right application request from a control device having no access right.

In this embodiment, the terminal device may be a terminal device such as a UPnP device, and a specific form of the terminal device is not limited in this embodiment. In this embodiment, the control device having no access right may be a control point (CP) having no access right, and a specific form of the control device having no access right is not limited in this embodiment.

Step 102: The terminal device notifies a control device having an administrator right to assign a right to the control device having no access right.

In this embodiment, the control device having an administrator right may be a CP having an administrator right, and a specific form of the control device having an administrator right is not limited in this embodiment.

Step 103: The terminal device receives a right assignment command from the control device having an administrator right and assigns a right to the control device having no access right.

In an implementation manner of this embodiment, before the terminal device receives the right application request from the control device having no access right in step 101, the terminal device may further receive a query request from the control device having no access right, where the query request is used to query right information required for performing a management operation to be performed on the terminal device. Then, the terminal device may send, according to the query request, the right information, which is required by the control device having no access right for performing the management operation to be performed on the terminal device, to the control device having no access right. In this way, receiving, by the terminal device, the right application request from the control device having no access right may be: receiving, by the terminal device, a right application request which at least includes information to be authorized and is sent by the control device having no access right, where the information to be authorized at least includes the right information found by the control device having no access right through querying.

When the management operation to be performed includes a management operation to be performed related to a data model, the query request may be further used to query right information required for performing an operation on a parameter corresponding to the management operation to be performed.

In another implementation manner of this embodiment, the right application request at least includes a name of a management operation to be performed on the terminal device by the control device having no access right. In this implementation manner, before the terminal device notifies the control device having an administrator right to assign a right to the control device having no access right, the terminal device may further determine, at least according to the name of the management operation to be performed on the terminal device by the control device having no access right, right information required by the control device having no access right for performing the management operation to be performed on the terminal device. Then, the terminal device may generate, at least according to the determined right information, information to be authorized.

When the management operation to be performed includes a management operation to be performed related to a data model, the right application request further carries a name of a parameter corresponding to the management operation to be performed. In this case, before the terminal device notifies the control device having an administrator right to assign a right to the control device having no access right, the terminal device may further determine, at least according to the name of the parameter corresponding to the management operation to be performed, right information required by the control device having no access right for performing an operation on the parameter corresponding to the management operation to be performed.

In the foregoing two implementation manners of this embodiment, notifying, by the terminal device, the control device having an administrator right to assign a right to the control device having no access right may be saving, by the terminal device, the information to be authorized and sending a notification message to the control device having an administrator right, where the notification message is used to notify the control device having an administrator right to query the information to be authorized from the terminal device and assign a right to the control device having no access right. Alternatively, the notification message may carry the information to be authorized, that is, the terminal device may send, through the notification message, the information to be authorized to the control device having an administrator right, to notify the control device having an administrator right to assign a right to the control device having no access right.

In this embodiment, after the terminal device receives the right assignment command from the control device having an administrator right and assigns a right to the control device having no access right in step 103, the terminal device may further notify that the control device having no access right is authorized.

Furthermore, in this embodiment, after the terminal device notifies the control device having an administrator right to assign a right to the control device having no access right, and before the terminal device receives the right assignment command from the control device having an administrator right, the control device having an administrator right first needs to determine that the control device having no access right is legal before sending the right assignment command to the terminal device.

The information to be authorized may further include an authentication code and an identifier of the control device having no access right, where the authentication code may include a first hash value of a personal identification number (PIN) of the control device having no access right and the identifier of the control device having no access right. In this case, determining, by the control device having an administrator right, that the control device having no access right is legal may be: receiving, by the control device having an administrator right, the PIN of the control device having no access right, calculating a second hash value of the PIN and the identifier of the control device having no access right, then comparing the second hash value with the first hash value, and when the second hash value is the same as the first hash value, determining, by the control device having an administrator right, that the control device having no access right is legal.

Alternatively, the authentication code may also include a certificate of the control device having no access right. In this case, determining, by the control device having an administrator right, that the control device having no access right is legal may be: authenticating, by the control device having an administrator right, the certificate of the control device having no access right through a root certificate, and after the authentication succeeds, determining that the control device having no access right is legal.

In this embodiment, the information to be authorized may have multiple implementation forms, for example, the information to be authorized may be implemented in multiple forms such as a list or an array. The specific implementation form of the information to be authorized is not limited in this embodiment.

In the foregoing embodiment, after receiving the right application request from the control device having no access right, the terminal device notifies the control device having an administrator right to assign a right to the control device having no access right. Then, the terminal device may receive the right assignment command from the control device having an administrator right and assign a right to the control device having no access right. In this way, the control device having no access right applies for a right proactively to obtain authorization for performing a management operation to be performed on the terminal device, thereby facilitating an operation of a user.

Figure 2:
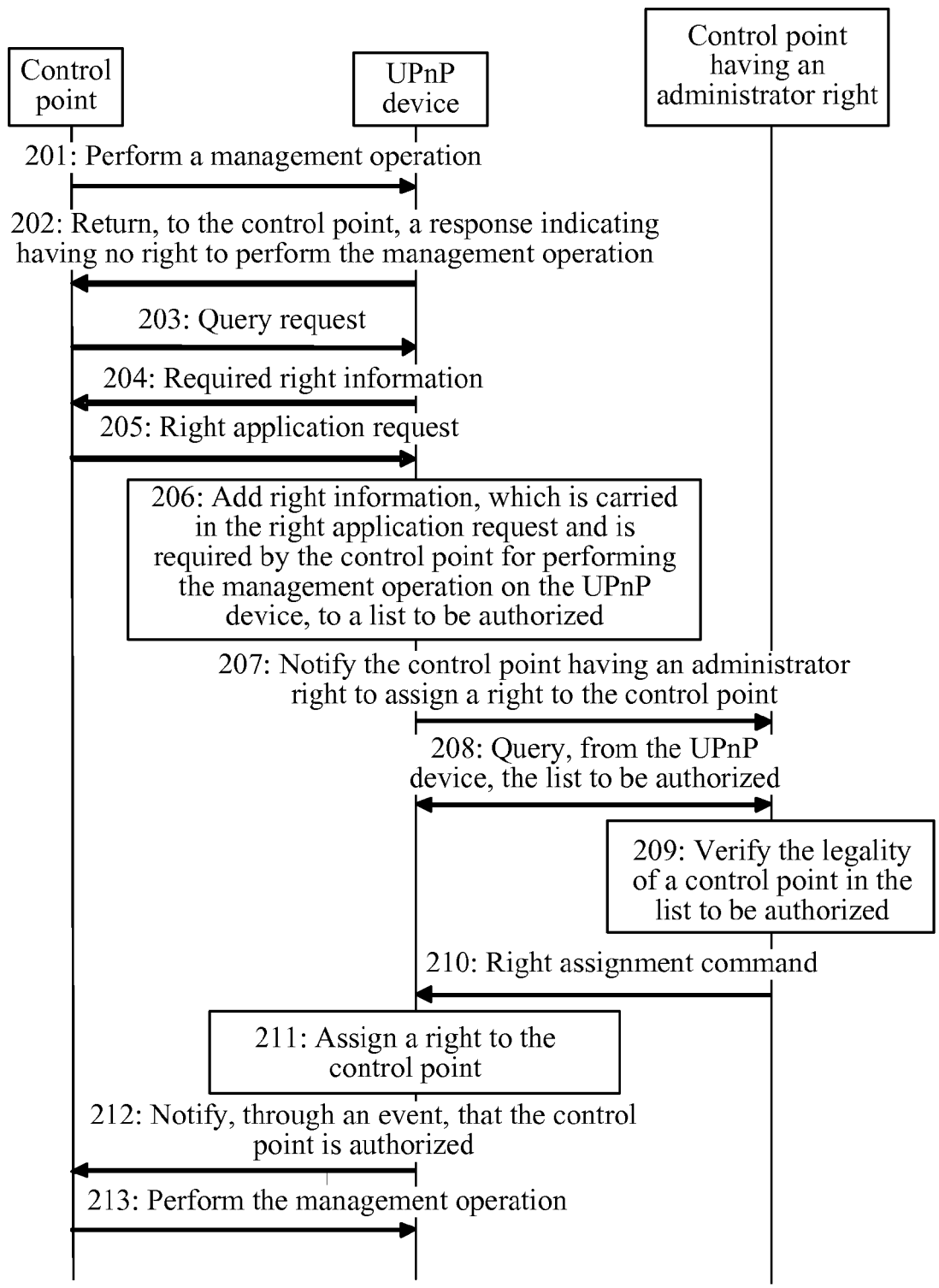
FIG. 2 is a flow chart of another embodiment of an authorization method according to the present invention.

FIG. 2 is a flow chart of another embodiment of an authorization method according to the present invention. In this embodiment, that a terminal device is a UPnP device and a control device having no access right is a control point is taken as an example for illustration.

As shown in FIG. 2, the authorization method may include the following steps.

Step 201: A control point performs a management operation on a UPnP device.

Step 202: The UPnP device performs right authentication for the control point, finds that the control point has no right to perform the management operation, and returns, to the control point, a response indicating having no right to perform the management operation, for example, error code=606.

In this embodiment, step 201 and step 202 are optional steps.

Step 203: The control point sends a query request to the UPnP device, to query a right required for performing the management operation.

Specifically, the control point uses the following query manners.

Solution 1:

Step 1: Query, through a GetRolesForAction command, a right required for performing a certain management operation.

Step 2: For a management operation related to a data model, further query a right required for performing an operation on a parameter corresponding to the management operation, which may be specifically implemented through the following command:

newly added management operation command: getrolesfordatamodel( );

parameter: Operation: an operation to be performed on a parameter corresponding to the management operation, where a value of the parameter may be a read operation (read), a write operation (write), or a list operation (list);

ParameterList: a parameter list of rights to be queried;

function: querying a right required for performing an operation on a parameter corresponding to the management operation.

Solution 2:

Step 1: Query a right required for performing all management operations to be performed, which may be specifically implemented through the following command:

newly added management operation command: GetRolesForActionList( );

parameter: ActionList, a management operation list of rights to be queried;

function: querying a right required for performing all management operations to be performed.

Step 2: For a management operation to be performed related to a data model, further query a right required for performing an operation on a parameter corresponding to the management operation, where the querying may be specifically performed by using a getrolesfordatamodel( ) command. For the description of this command, reference may be made to the description in solution 1, which is not elaborated herein.

Solution 3:

Step 1: Query rights required for performing all management operations to be performed and for performing operations on parameters corresponding to the management operations to be performed, which may be specifically implemented through the following command:

newly added management operation command: GetRoles( );

parameter: actionList: all management operations to be performed and parameters corresponding to the management operations to be performed;

function: querying rights required for performing all management operations to be performed and for performing operations on parameters corresponding to the management operations to be performed.

Step 204: The UPnP device sends required right information to the control point according to the query request.

Step 205: The control point sends a right application request to the UPnP device. In this embodiment, the right application request carries a control point identifier (Control Point Identifier, CPID for short in the following), a role (Role) to be applied for, and an authentication code (Authcode). Specifically, the right application request may be shown as follows:

newly added management operation command: ApplyRole( );

parameter: CPID: a control point identifier;

Role: a role to be applied for, used to indicate right information required by the control point for performing the management operation on the UPnP device;

AuthCode: an authentication code, which may be a first hash (hash) value of a PIN and CPID of the control point or a certificate of the control point, and is used to perform legality authentication for the control point.

Step 206: The UPnP device adds the right information, which is carried in the right application request and is required by the control point for performing the management operation on the UPnP device, to a list to be authorized. The list to be authorized is an implementation form of information to be authorized. Of course, the information to be authorized may be implemented in other forms, such as an array, which is not limited in this embodiment.

In this embodiment, a format of the list to be authorized may be as follows:

| Control point identifier | Role to be applied for | Authentication code |
| --- | --- | --- |

Step 207: The UPnP device notifies a control point having an administrator right to assign a right to the control point.

In this embodiment, the UPnP device may multicast a to-be-authorized notification event to at least one control point having an administrator right, to notify the control point having an administrator right to assign a right to the control point; or, may not only multicast a to-be-authorized notification event to at least one control point having an administrator right, but also unicast the to-be-authorized notification event to each control point having an administrator right, to notify the control point having an administrator right to assign a right to the control point.

Step 208: The control point having an administrator right actives an authorization procedure, and queries, from the UPnP device, the list to be authorized.

Step 209: The control point having an administrator right verifies the legality of a control point in the list to be authorized. If the control point having an administrator right determines that the control point in the list to be authorized is legal, step 210 is performed; if the control point having an administrator right determines that the control point in the list to be authorized is illegal, the procedure ends.

Specifically, the control point having an administrator right may receive a PIN of a control point in the list to be authorized, then calculate a second hash value of the PIN and a CPID, and compare the second hash value with the first hash value in the list to be authorized in step 206. If the second hash value is the same as the first hash value, it is determined that the control point in the list to be authorized is legal; if the second hash value is not the same as the first hash value, it is determined that the control point in the list to be authorized is illegal. The PIN of the control point in the list to be authorized is obtained in advance by a user using the control point having an administrator right, and is input after the prompt of the control point having an administrator right. For example, after finding, through querying, the list to be authorized, the control point having an administrator right may prompt the user using the control point having an administrator right to input the PIN of the control point in the list to be authorized. The control point having an administrator right then may receive the PIN input by the user using the control point having an administrator right, and calculate the second hash value of the received PIN and the CPID.

Alternatively, the control point having an administrator right may perform authentication, through a root certificate, on a certificate of a control point in the list to be authorized, determine that the control point in the list to be authorized is legal if the authentication succeeds; determine that the control point in the list to be authorized is illegal if the authentication fails.

Step 210: The control point having an administrator right sends a right assignment command to the UPnP device. Specifically, the right assignment command may be an AddRolesForIdentity( ) command.

Step 211: The UPnP device receives the right assignment command sent by the control point having an administrator right and assigns a right to the control point.

Step 212: The UPnP device notifies, through an event, that the control point is authorized.

Specifically, a state variable, namely, a list of control point identifiers (CPIDlist), may be added, to record an identifier of a control point whose right changes.

Step 213: The control point performs the management operation on the UPnP device.

In the foregoing embodiment, after receiving the response which indicates having no right to perform the management operation and is returned by the UPnP device, the control point may first query, from the UPnP device, a right required for performing the management operation, and then apply to the UPnP device for the right. After receiving the right application request from the control point, the UPnP device first adds, to the list to be authorized, the right required for performing the management operation, and notifies the control point having an administrator right to query, from the UPnP device, the list to be authorized. After the control point having an administrator right determines that the control point in the list to be authorized is legal, and authorizes, from the UPnP device, the control point in the list to be authorized, the UPnP device notifies that the control point is authorized. In this way, a control point having no right to perform a management operation applies to the UPnP device proactively for a right required for performing the management operation, thereby facilitating an operation of a user.

Figure 3:
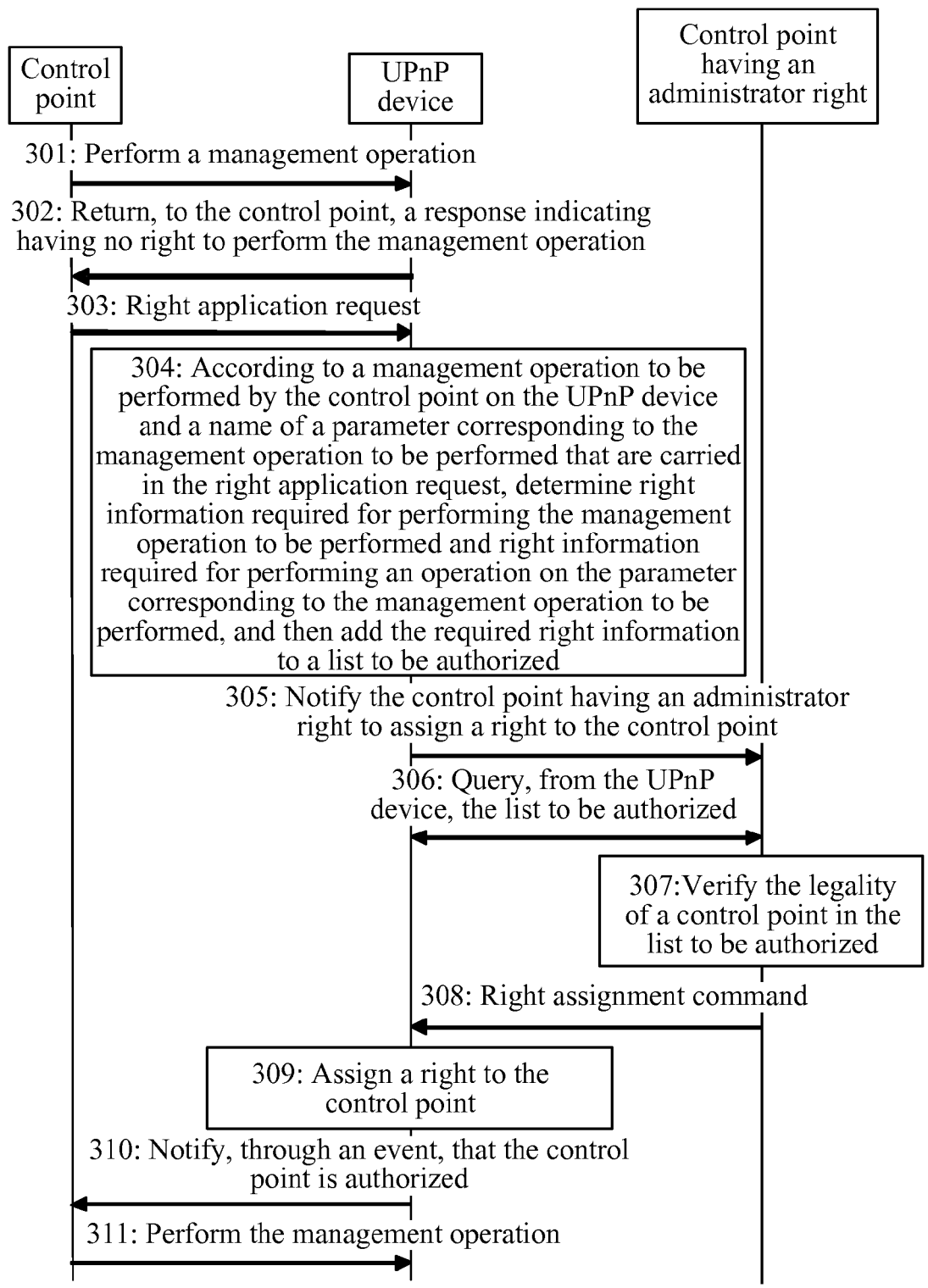
FIG. 3 is a flow chart of still another embodiment of an authorization method according to the present invention.

FIG. 3 is a flow chart of still another embodiment of an authorization method according to the present invention. In this embodiment, that a terminal device is a UPnP device and a control device having no access right is a control point is taken as an example for illustration.

As shown in FIG. 3, the authorization method may include the following steps.

Step 301: A control point performs a management operation on a UPnP device.

Step 302: The UPnP device performs right authentication on the control point, finds that the control point has no right to perform the management operation, and returns a response indicating having no right to perform the management operation to the control point, for example, error code=606.

In this embodiment, step 301 and step 302 are optional steps.

Step 303: The control point sends a right application request to the UPnP device. In this embodiment, the right application request carries a CPID, a management operation to be performed by the control point on the UPnP device, a name (Name) of a parameter corresponding to the management operation to be performed, and an authentication code (Authcode). Specifically, the right application request may be shown as follows:

newly added management operation command: ApplyRole( );

parameter: CPID: a control point identifier;

Name: a management operation to be performed by the control point on the UPnP device and a name of a parameter corresponding to the management operation to be performed;

AuthCode: an authentication code, which may be a first hash (hash) value of a PIN and CPID of the control point or a certificate of the control point, and is used to perform legality authentication on the control point.

Step 304: The UPnP device determines, according to the management operation to be performed by the control point on the UPnP device and the name of the parameter corresponding to the management operation to be performed that are carried in the right application request, right information required for performing the management operation to be performed and right information required for performing an operation on the parameter corresponding to the management operation to be performed, and then adds the required right information to a list to be authorized. The list to be authorized is an implementation form of information to be authorized. Of course, the information to be authorized may also be implemented in other forms, such as an array, which is not limited in this embodiment.

In this embodiment, a format of the list to be authorized may be as follows:

| Control point identifier | Role to be applied for | Authentication code |
| --- | --- | --- |

Step 305: The UPnP device notifies a control point having an administrator right to assign a right to the control point.

In this embodiment, the UPnP device may multicast a to-be-authorized notification event to at least one control point having an administrator right, to notify the control point having an administrator right to assign a right to the control point; or, may not only multicast a to-be-authorized notification event to at least one control point having an administrator right, but also unicast the to-be-authorized notification event to each control point having an administrator right, to notify the control point having an administrator right to assign a right to the control point.

Step 306: The control point having an administrator right actives an authorization procedure, and queries, from the UPnP device, the list to be authorized.

Step 307: The control point having an administrator right verifies the legality of a control point in the list to be authorized. If the control point having an administrator right determines that the control point in the list to be authorized is legal, step 308 is performed; if the control point having an administrator right determines that the control point in the list to be authorized is illegal, the procedure ends.

Specifically, the control point having an administrator right may receive a PIN of a control point in the list to be authorized, then calculate a second hash value of the PIN and a CPID, and compare the second hash value with the first hash value in the list to be authorized in step 306. If the second hash value is the same as the first hash value, it is determined that the control point in the list to be authorized is legal; if the second hash value is not the same as the first hash value, it is determined that the control point in the list to be authorized is illegal. The PIN of the control point in the list to be authorized is obtained in advance by a user using the control point having an administrator right, and is input after the prompt of the control point having an administrator right. For example, after finding, through querying, the list to be authorized, the control point having an administrator right may prompt the user using the control point having an administrator right to input the PIN of the control point in the list to be authorized. The control point having an administrator right then may receive the PIN input by the user using the control point having an administrator right, and calculate the second hash value of the received PIN and the CPID.

Alternatively, the control point having an administrator right may perform authentication, through a root certificate, on a certificate of a control point in the list to be authorized, determine that the control point in the list to be authorized is legal if the authentication succeeds; determine that the control point in the list to be authorized is illegal if the authentication fails.

Step 308: The control point having an administrator right sends a right assignment command to the UPnP device. Specifically, the right assignment command may be an AddRolesForIdentity( ) command.

Step 309: The UPnP device receives the right assignment command sent by the control point having an administrator right and assigns a right to the control point.

Step 310: The UPnP device notifies, through an event, that the control point is authorized.

Specifically, a state variable, namely, a list of control point identifiers (CPIDlist), may be added, to record an identifier of a control point whose right changes.

Step 311: The control point performs the management operation on the UPnP device.

In the foregoing embodiment, after receiving the response which indicates having no right to perform the management operation and is returned by the UPnP device, the control point may directly apply to the UPnP device for a right required for performing the management operation. After receiving the right application request from the control point, the UPnP device first determines the right required for performing the management operation, then adds the required right to the list to be authorized, and notifies the control point having an administrator right to query, from the UPnP device, the list to be authorized. After the control point having an administrator right determines that the control point in the list to be authorized is legal and authorizes, from the UPnP device, the control point in the list to be authorized, the UPnP device notifies that the control point is authorized. In this way, a control point having no right to perform a management operation applies to the UPnP device proactively for a right required for performing the management operation, thereby facilitating an operation of a user.

Persons of ordinary skill in the art should understand that all or part of the steps of the foregoing method embodiments may be implemented by a program instructing relevant hardware. The foregoing program may be stored in a computer readable storage medium. When the program runs, the above steps included in the method embodiments are performed. The foregoing storage medium may be any medium capable of storing program codes, such as a ROM, a RAM, a magnetic disk, or an optical disk.

Figure 4:
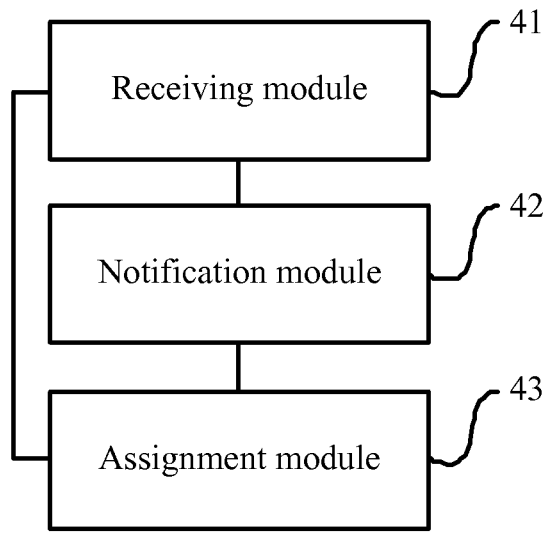
FIG. 4 is a schematic structural diagram of an embodiment of a terminal device according to the present invention.

FIG. 4 is a schematic structural diagram of an embodiment of a terminal device according to the present invention. In this embodiment, the terminal device may implement the process of the embodiment shown in FIG. 1 of the present invention. As shown in FIG. 4, the terminal device may include modules 41, 42 and 43. In particular, a receiving module 41 is configured to receive a right application request from a control device having no access right. A notification module 42 is configured to notify a control device having an administrator right to assign a right to the control device having no access right. An assignment module 43 is configured to assign a right to the control device having no access right after the receiving module 41 receives a right assignment command from the control device having an administrator right.

In this embodiment, the terminal device may be a terminal device such as a UPnP device, and a specific form of the terminal device is not limited in this embodiment. In this embodiment, the control device having no access right may be a control point having no access right, and a specific form of the control device having no access right is not limited in this embodiment. In this embodiment, the control device having an administrator right may be a control point having an administrator right, and a specific form of the control device having an administrator right is not limited in this embodiment.

In the foregoing embodiment, after the receiving module 41 receives the right application request from the control device having no access right, the notification module 42 notifies the control device having an administrator right to assign a right to the control device having no access right. Then, the receiving module 41 may receive the right assignment command from the control device having an administrator right; and subsequently, the assignment module 43 assigns a right to the control device having no access right. In this way, the control device having no access right applies for a right proactively to obtain authorization for performing a management operation to be performed on the terminal device, thereby facilitating an operation of a user.

Figure 5:
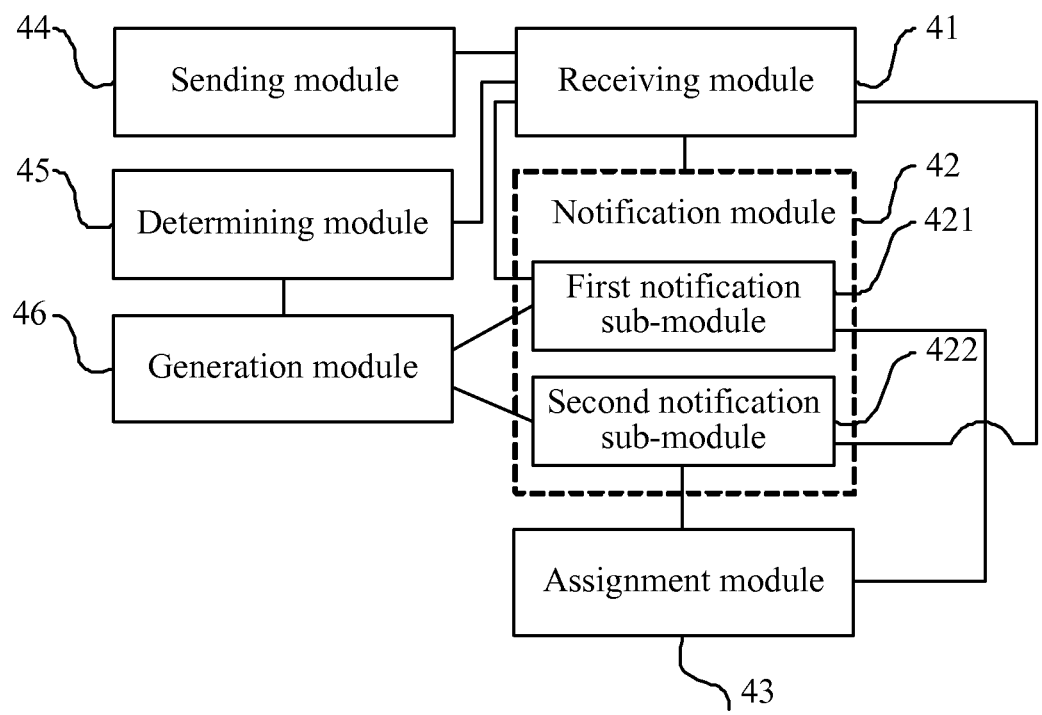
FIG. 5 is a schematic structural diagram of another embodiment of a terminal device according to the present invention.

FIG. 5 is a schematic structural diagram of another embodiment of a terminal device according to the present invention. In this embodiment, the terminal device may implement the processes of the embodiments shown in FIG. 1, FIG. 2, and FIG. 3 of the present invention. Compared with the terminal device shown in FIG. 4, the difference lies in that, the terminal device shown in FIG. 5 may further include: a sending module 44.

In this embodiment, before receiving the right application request from the control device having no access right, the receiving module 41 may further receive a query request from the control device having no access right, where the query request is used to query right information required for performing a management operation to be performed on the terminal device; and may further receive a right application request which at least includes information to be authorized and is sent by the control device having no access right, where the information to be authorized at least includes the right information found through querying by the control device having no access right.

The sending module 44 is configured to send, at least according to the query request received by the receiving module 41, the right information, which is required by the control device having no access right for performing the management operation to be performed on the terminal device, to the control device having no access right.

In addition, when the management operation to be performed includes a management operation to be performed related to a data model, the query request is further used to query right information required for performing an operation on a parameter corresponding to the management operation to be performed.

Furthermore, the terminal device may further include a determining module 45, which configured to determine, at least according to a name, included in the right application request received by the receiving module 41, of the management operation to be performed on the terminal device by the control device having no access right, right information required by the control device having no access right for performing the management operation to be performed on the terminal device. A generation module 46 is configured to generate, at least according to the right information determined by the determining module 45, information to be authorized.

Furthermore, when the management operation to be performed includes a management operation to be performed related to a data model, the determining module 45 may further determines, at least according to a name, carried in the right application request, of a parameter corresponding to the management operation to be performed right information required by the control device having no access right for performing an operation on the parameter corresponding to the management operation to be performed.

In this embodiment, the notification module 42 may at least include at least one of the following modules. A first notification sub-module 421 is configured to send a notification message to the control device having an administrator right. The notification message may be used to notify the control device having an administrator right to query, from the terminal device, the information to be authorized generated by the generation module 46 and assign a right to the control device having no access right. A second notification sub-module 422 is configured to send a notification message to the control device having an administrator right. The notification message at least carries the information to be authorized generated by the generation module 46. That is, the second notification sub-module 422 may send, through the notification message, the information to be authorized to the control device having an administrator right, to notify the control device having an administrator right to assign a right to the control device having no access right.

Furthermore, after the assignment module 43 assigns a right to the control device having no access right, the notification module 42 may further notify that the control device having no access right is authorized.

After receiving the right application request from the control device having no access right, the terminal device may authorize the control device having no access right, so that the control device having no access right obtains a right required for performing a management operation on the terminal device, thereby facilitating an operation of a user.

It should be understood by persons skilled in the art that the accompanying drawings are merely schematic diagrams of an exemplary embodiment, and modules or processes in the accompanying drawings are not necessarily required in implementing the present invention.

Persons skilled in the art should understand that the modules in the apparatus provided in an embodiment may be arranged in the apparatus in a distributed manner according to the description of the embodiment, or may be arranged in one or multiple apparatuses which are different from those described in the embodiment. The modules in the foregoing embodiment may be combined into one module, or split into a plurality of sub-modules.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, and such modifications or replacements cannot make the essence of the corresponding technical solutions depart from the idea and scope of the technical solutions of the embodiments of the present invention.

What is claimed is:

1. An authorization method, comprising:
    receiving, by a terminal device, a query request carrying a name of a management operation to be performed on the terminal device from a first control device;
    receiving, by the terminal device, a right application request from the first control device, wherein the first control device does not have a right required for performing a management operation to be performed on the terminal device;
    determining, by the terminal device and at least according to the name of the management operation to be performed on the terminal device, a first right information which describes the right required by the first control device for performing a management operation to be performed on the terminal device;
    generating an information to be authorized by the terminal device, the information to be authorized being generated at least according to the first right information;
    sending, by the terminal device, a notification message carrying the information to be authorized to a second control device to assign the right required for performing a management operation to be performed on the terminal device to the first control device, wherein the second control device has an administrator right; and
    receiving, by the terminal device, a right assignment command from the second control device and assigning the right required for performing a management operation to be performed on the terminal device to the first control device; and
    notifying, by the terminal device, that the first control device is authorized.

2. The method according to claim 1, wherein before the terminal device receives the right application request from the first control device, the method further comprises:
    sending, by the terminal device, according to the query request, the first right information to the first control device, wherein the terminal device receives the right application request from the first control device by receiving the right application request that at least comprises the information to be authorized and is sent by the first control device, wherein the information to be authorized at least comprises the first right information found through querying by the first control device.

3. The method according to claim 1, wherein the management operation to be performed comprises a management operation to be performed related to a data model, and the query request is further used to query a second right information which describes the right required for performing an operation on a parameter corresponding to the management operation to be performed.

4. A terminal device, comprising:
a receiving module, configured to receive a right application request from a first control device, wherein the first control device does not have a right required for performing a management operation to be performed on the terminal device, and further configured to receive a query request from the first control device before receiving the right application request from the first control device, wherein the query request carries a name of a management operation to be performed on the terminal device;
a notification module, configured to send a notification message carrying an information to be authorized to a second control device to assign the right required for performing a management operation to be performed on the terminal device to the first control device, wherein the second control device has an administrator right, and further configured to notify that the first control device is authorized after an assignment module assigns the right required for performing a management operation to be performed on the terminal device to the first control device;
the assignment module, configured to receive a right assignment command from the second control device and assign the right required for performing a management operation to be performed on the terminal device to the first control device;
a determining module, configured to determine, at least according to the name of the management operation to be performed on the terminal device, a first right information which describes the right required by the first control device for performing a management operation to be performed on the terminal device; and
a generating module, configured to generate the information to be authorized, the information to be authorized being generated at least according to the first right information.

5. The terminal device according to claim 4, further comprising a sending module;
wherein the sending module is further configured to send the first right information to the first control device according to the query request; and
wherein the receiving module is configured to receive the right application request which at least comprises the information to be authorized and is sent by the first control device, wherein the information to be authorized at least comprises the right information found through querying by the first control device.

6. A terminal device, comprising:
a receiver, configured to:
receive a right application request from a first control device, wherein the first control device does not have a right required for performing a management operation to be performed on the terminal device;
receive a query request carrying a name of a management operation to be performed on the terminal device from the first control device before receiving the right application request from the first control device, wherein the query request is used to query a first right information which describes the right required for performing a management operation to be performed on the terminal device; and
receive a right assignment command from a second control device;
a transmitter, configured to:
send a notification message carrying an information to be authorized to the second control device to assign the right required for performing a management operation to be performed on the terminal device to the first control device, wherein the second control device has an administrator right; and
notify that the first control device is authorized after a processor assigns the right required for performing a management operation to be performed on the terminal device to the first control device; and
the processor, configured to:
assign the right required for performing a management operation to be performed on the terminal device to the first control device;
determine, at least according to the name of the management operation to be performed on the terminal device, the first right information; and
generate the information to be authorized, the information to be authorized being generated at least according to the first right information.

7. The terminal device according to claim 6;
wherein the transmitter is further configured to send the first right information to the first control device according to the query request; and
wherein the receiver is configured to receive the right application request which at least comprises the information to be authorized and is sent by the first control device, wherein the information to be authorized at least comprises the right information found through querying by the first control device.

* * * * *